Sept. 15, 1970          C. R. SACCHINI          3,528,533

CHATTERLESS SPRING CLUTCH MECHANISM

Filed April 14, 1969

INVENTOR.
COLUMBUS R. SACCHINI

BY

*Arthur Frederick*
ATTORNEY

United States Patent Office 3,528,533
Patented Sept. 15, 1970

3,528,533
CHATTERLESS SPRING CLUTCH MECHANISM
Columbus R. Sacchini, Willowick, Ohio, assignor to The Marquette Metal Products Co., a corporation of Ohio
Filed Apr. 14, 1969, Ser. No. 815,767
Int. Cl. F16d *13/08, 49/02*
U.S. Cl. 192—41                                          3 Claims

ABSTRACT OF THE DISCLOSURE

The spring clutch mechanism comprises input and output drum members and a spring overlying the drums and overrunning the output drum member in one condition of operation. The input and output drum members have reduced diameter portions adjacent the crossover gap to provide stepped cross-over surfaces. The reduced diameter portions are fabricated in accordance with specific formulae so that the reduced portions are small enough in diameter to prevent chatter (unintentional rapid engagement and disengagement of the spring with the output member when in an overrunning operative condition) but large enough in diameter to prevent distortion of the spring.

BACKGROUND OF THE INVENTION

This invention relates to spring clutch mechanisms and more particularly to a chatterless spring clutch-brake mechanism of the type having a spring associated with a fixed drum and a rotary drum so as to permit rotation of the rotary drum in one direction and lock the rotary drum against rotation in the opposite direction (hereinafter referred to as a "backstopping clutch").

DESCRIPTION OF PRIOR ART

Heretofore, backstopping clutches, such as shown in the U.S. patents to Brownlee, No. 1,952,415; Litchfield, No. 2,073,408; and Flieg, No. 3,087,587 have been subject to chattering action which is the unintentional and rapid engagement and disengagement of the spring and the adjacent fixed drum. The chattering occurrence is caused by an intermittent high coefficient of friction developing between the adjacent surfaces of the spring and fixed drum due to dirt, fretting corrosion, non-uniform lubrication, or a combination of these factors. This increased frictional torque force exerted on the spring acts in a direction to expand or open the spring coils, thereby accumulating a torque force in the spring acting in the opposite direction. Eventually, this stored moment or torque force in the spring, when its magnitude exceeds that of the frictional torque force or the frictional torque force ceases, impels the end of the spring adjacent the fixed drum in a direction to contract a portion of the spring coils so that it momentarily grips the fixed drum. This chattering action, even if in a particular installation is functionally tolerable, is objectionable because of the excessive noise generated and undue wear caused thereby.

This problem of intermittent or spasmodic engagement and disengagement (chattering) of spring clutch mechanisms during overrunning was recognized in the Tomko Pat. No. 3,128,863 and the patent to Botnick, No. 3,249,190. The Tomko patent discloses a solution to the problem, which solution involves reducing the diameters of the input and output members of the clutch adjacent the crossover gap so that the overrunning torque exerted on the spring coils adjacent the cross-over gap will be less than that required to cause the coil portion to contract and grip the surfaces of the reduced diameter portions. While the Tomko patent provides a feasible solution to the problem, the dimensions of the reduced diameter portions for various clutch designs is difficult and expensive to achieve and necessitates a trial and error method of fabrication.

It is, therefore, an object of this invention to provide a chatterless spring clutch mechanism which is relatively cheap to design and fabricate and which is relatively quiet in operation and has a relatively long operative life.

SUMMARY OF THE INVENTION

It is therefore contemplated by the present invention to provide a spring clutch mechanism comprising input and output drum elements disposed adjacent to and spaced from each other to define therebetween a cross-over gap. At least one of the drum elements is suitably supported for rotation. A helically wound coil spring is disposed coaxially relative to the input and output drum elements and spanning the cross-over gap. The spring is constructed and arranged to coact with the input and output drum elements to grip both the input and output drum elements in one operative condition and release its grip on one of the elements by expansion of the coils in another operative condition. The input and output drum elements are provided with reduced diameter portions extending from the cross-over gap, which portions are dimensioned in accordance with the following formula:

$$T = \frac{T_e \times 6.6 D_m N}{E b h^3} \times 360°$$

wherein $T_e$ is inch-pound overrunning torque force causing unwind of the spring;
$E$ is the elastic modulus of the spring material;
$b$ is width of spring stock;
$h$ is height of spring stock;
$T$ is the degrees of spring unwind;
$D_m$ is means diameter of the spring when mounted on the hub; and
$N$ is the number of active spring coils being expanded, (the number of spring coils less the number under a heavy interference fit, if any)

and the formula $$a = \frac{\theta D_x}{N_c \times 360}$$

wherein $\theta$ is the angular deflection of the spring (T approximately doubled to allow for additional deflection due to increased frictional torque caused by foreign matter or corrosion);
$N_c$ is the number of coils adjacent the reduced diameter portions of the input and output elements;
$D_x$ is the mean spring coil diameter at the reduced diameter portions of the input and output members;
$a$ is the spring deflection or reduction at the reduced diameter portions.

BRIEF DESCRIPTION OF THE DRAWINGS

The invention will be more fully understood from the following description when considered in connection with the accompanying drawings in which.

DESCRIPTION OF THE PREFERRED EMBODIMENT

Figure 1:
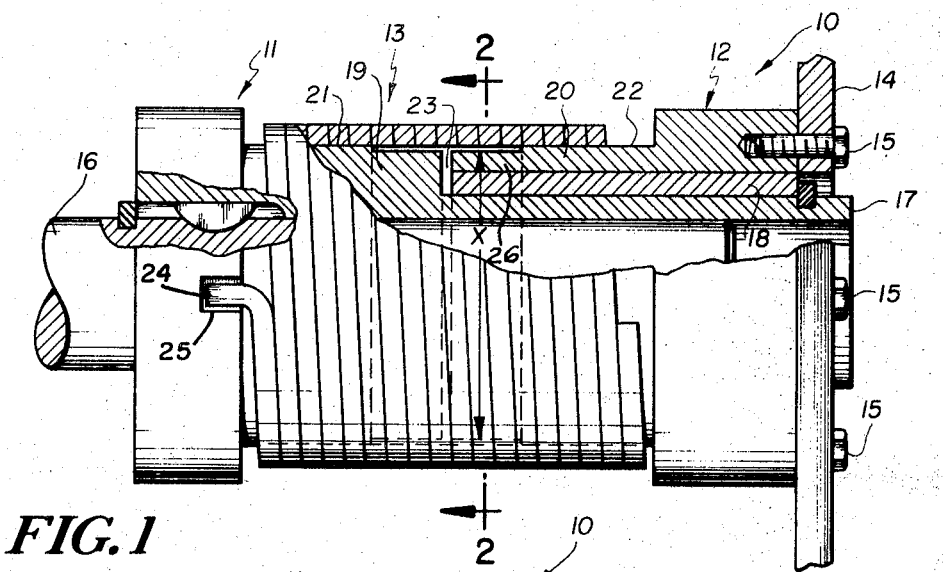
FIG. 1 is an elevational view of the spring clutch mechanism according to this invention with parts broken away for illustration purposes.
Figure 2:
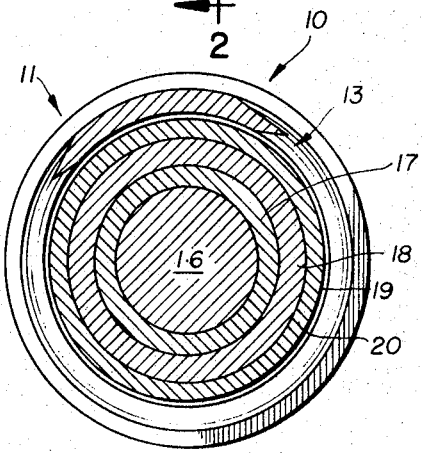
FIG. 2 is a cross-sectional view taken along line 2—2 of FIG. 1.
Figure 3:
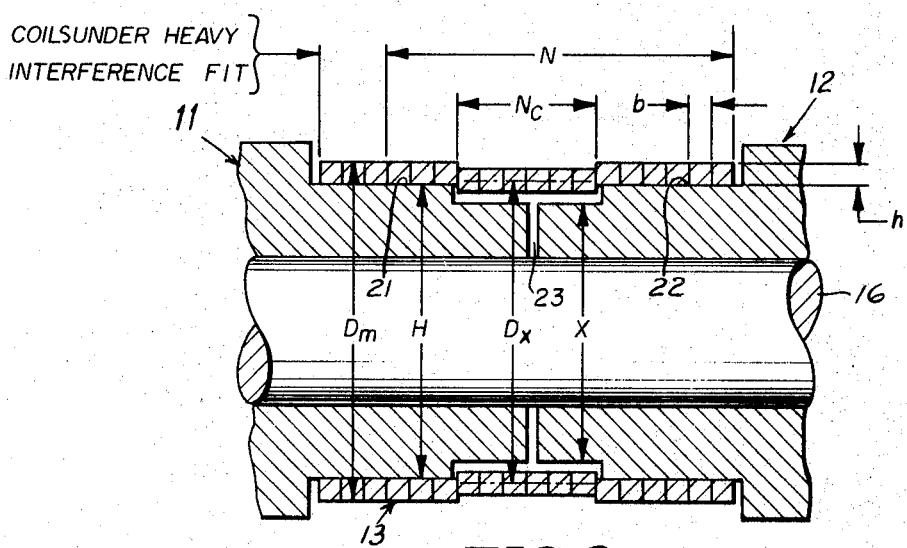
FIG. 3 is a schematic view in cross-section of the mechanism shown in FIG. 1.

Now referring to the drawings and more specifically FIGS. 1 and 2, the reference number 10 generally designates the spring clutch mechanism according to the present invention. While spring clutch mechanism 10 is disclosed as a backstopping clutch it is to be understood that the invention is not limited thereto. Also, without departure from the scope and spirit of the invention, the spring may be connected to one of the clutch elements by a toe and slot arrangement, as shown in FIG. 1, or by interference fit of relatively large magnitude, as indicated in FIG. 3.

As illustrated in FIG. 1, spring clutch mechanism 10 comprises a first clutch element or input drum 11, a second clutch element or output drum 12 and a helically wound spring 13 coacting with the input drum 11 and output drum 12 to engage and disengage the input and output drums.

The output drum 12 is fixedly secured to a support 14 by a plurality of bolts 15 or other suitable means. The input drum 11 is keyed to a shaft 16 for conjoined rotation with the latter and is journaled for rotation within output drum 12 by a hub portion 17 which extends into a sleeve bearing 18 supported within output drum 12. Input drum 11 and output drum 12 are each provided with a reduced diameter portion 19 and 20, respectively. The reduced diameter portions 19 and 20 are dimensioned to provide coextensive, annular gripping or cross-over surfaces 21 and 22, respectively. Input and output drums 11 and 12 are also in endwise, close, spaced relationship to define a cross-over gap 23.

The spring 13 is a cylindrical, close wound, helical coil which is secured to input drum 11 by an offset toe portion 24 engaging a slot 25 in input drum 11. As previously stated, spring 13, as illustrated in FIG. 3, may be a full "free floating" spring without departing from the scope and spirit of this invention. In a full, free floating embodiment, the spring is secured to input drum 11 and output drum 12 by an interference fit, at the endmost coils, of large magnitude with input drum 11 and under a light interference fit with output drum 12. The lead of the spring is such that rotation of shaft 16, in one direction, causes the coils to contract and embrace cross-over surfaces 21 and 22 of input and output drums 11 and 12 to thereby lock or arrest input drum 11 against rotation, while rotation in the opposite direction will cause the coils, through frictional torque imposed thereon, to expand and overrun cross-over surface 22 of the output drum. In this latter condition of operation, spring 13 maintains its connection with input drum 11 through the toe and slot interconnection (FIG. 1) or interference fit of the endmost coils (see FIG. 3).

To avoid rapid, intermittent or spasmodic engagement and disengagement of spring 13 with the cross-over surface 22 of output drum 12 during override, input drum 11 and output drum 12 are each provided with a stepped or further reduced diameter portion 26 (designated X in FIG. 3) adjacent cross-over gap 23. This reduction in diameter in cross-over surfaces 21 and 22, is exaggerated in the drawings for illustration purposes. These stepped portions 26 are dimensioned such that chattering is prevented and distortion of the spring, when in engagement with output drum 12, is negligible.

In spring clutch mechanisms 10 of the type herein described and employing a spring 13 of constant cross-section and otherwise uniform spring stock, overrunning torque or drag (synonymous with energizing torque) acting on spring 13 can be computed in accordance with the formula $$T_e = 2EIA/D^2$$

(wherein E is the modulus of elasticity of the spring stock; I is the moment of inertia of the spring stock section; A is the diametral deflection or interference fit of the spring coils on the drum, and D is mean diameter of the coils when mounted on the drums). This means of determining overrunning torque is fully disclosed in the U.S. patent to Sacchini and Tomko, No. Re. 25,229.

In accordance with this invention and having obtained the overrunning torque ($T_e$), the dimension X of the step portions 26 of spring clutch mechanism 10 can be determined by utilization of the following formulae:

$$T = \frac{T_e \times 6.6 D_m N}{E b h^3} \times 360°$$

(wherein E is the elastic modulus of the spring stock; $b$ is the width of the spring stock; $h$ is the height of spring stock; T is the degrees of spring unwind; $D_m$ is the mean diameter of the spring coils when mounted on the clutch drums (hub diameter plus spring stock height $h$); and N is the number of active coils being expanded (total number of coils of spring less coils subject to interference fit of large value, if any), and, after having solved for T in the above formula, solve for $a$ (deflection or reduction of spring diameter at the stepped portions of crossover surface 21 and 22 adjacent to cross-over gap 23) in the following formula:

$$a = \frac{\theta D_x}{N_c \times 360}$$

(wherein $\theta$ is the angular deflection of the spring; $N_c$ is the number of coils overlying the stepped or reduced diameter portions of the cross-over surfaces 21 and 22; $D_x$ is the mean spring coil diameter at the stepped portions of the cross-over surfaces). The value for $\theta$ as applied to this formula is the value of T, as determined in the formula $$T = \frac{T_e \times 6.6 D_m N}{E b h^3} \times 360°$$

and approximately doubled to allow for the additional amount of unwind when dirt or corrosion develops on the input and output drums 11 and 12. Since the value $a$ is the deflection or reduction of spring diameter, it must be subtracted from the diameter of reduced diameter portions 19 and 20 to arrive at the value of X.

As an example of the use of the aforementioned formulae to determine the dimension X, assume the following characteristics of a spring clutch mechanism 10 which is to be fabricated to function without chattering:

(1) As shown in FIG. 3, a spring having 18 coils, the last three coils under an interference fit of large magnitude, i.e., .038, with input drum 11 and spring coils adjacent cross-over surface 22 being under a light interference fit, i.e., .010, with output drum 12 so that the active coils number 15 (N);

(2) Spring coils evenly spaced on the input and output drums with six coils spanning the stepped portion ($N_c$) and six coils spanning each of the non-stepped portions of the cross-over surfaces 21 and 22;

(3) An input and output drum diameter of 1 (H— see FIG. 3);

(4) A mean spring diameter when mounted on the drums of 1.060 inches ($D_m$);

(5) A spring steel stock having a modulus of elasticity of $30 \times 10^6$ (E);

(6) A spring stock width of .031 inch ($b$);

(7) A spring stock height of .060 inch ($h$);

(8) An overrunning torque tending to unwind the spring in inch-pounds of .03 ($T_e$); and (9) A mean diameter of the spring of 1.050 inches ($D_x$).

From these assumed values, the number of degrees the spring will open or expand (T) can be determined by substituting the appropriate values in the formula $$T = \frac{T_e \times 6.6 D_m N}{E b h^3} \times 360°$$

Since the unwinding will occur in 15 coils of the spring because the remaining 3 coils are subject to a large interference fit and therefore are in effect shunted, 15 is the value which is properly assigned to N. In substituting the value for N and the other values to solve for T in the above formula, the equation is as follows:

$$T = \frac{.03 \times 6.6 \times 1.060 \times 15}{30 \times 10^6 \times .031 \times (.06)^3} \times 360°$$

then $$T = \frac{.0157}{1} \times 360° = 5.6° \text{ of spring unwind (contraction)}$$

While T is the amount of spring unwind, it also represents the amount of winding or contraction of the spring because when the energy of unwinding is given up, it will cause approximately the same amount of coil contraction.

Since chattering is the result of dirt, corrosion, non-uniform lubrication or combination of these factors and the amount of which can only be estimated, it has been found, that by approximately doubling the calculated unwind (T), a clutch is provided wherein chattering is prevented under most conditions of spring clutch contaminations. Therefore, the value for $\theta$ (approximately 2T) in the hereinafter formula will be assumed to be 10° of coil contraction. Also since contraction of 10° can only take place in the 6 coils spanning the stepped portion of the cross-over surfaces 21 and 22, the value for $N_c$ in the hereinafter formula is 6. Thus, substituting the 10° as the value for $\theta$, 6 for $N_c$ as well as the other appropriate values in the formula $$a = \frac{\theta D_x}{N_c \times 360}$$

the equation becomes $$a = \frac{10 \times 1.050}{6 \times 360}$$

or $$a = .0054 \text{ inch (for simplicity say .006)}$$

After calculating $a$, the dimension X is determined in accordance with the formula $X = D_x - (h + a)$. Thus, the diameter of the stepped portions or the dimension X is .984 inch calculated from the formula wherein the sum of the height of the spring stock .060$h$ and .006 inch, the value of $a$, are subtracted from the mean diameter of the spring, 1.050 ($D_x$).

It is believed now readily apparent that a chatterless spring clutch has been described which can be quickly and easily fabricated and wherein expensive, time consuming trial and error design techniques have been eliminated.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:
1. A spring clutch mechanism comprising:
   (a) an input drum element,
   (b) an output drum element disposed adjacent to and spaced from said input drum element to define therebetween a cross-over gap,
   (c) at least one of said elements being supported for rotation,
   (d) a helically wound spring coaxially disposed relative to said input and output drum elements,
   (e) said spring being constructed and arranged to grip both the input and output elements in one operative condition and release its grip on one of the elements by expansion of the coils of the spring in another operative condition,
   (f) said input and output elements having reduced diameter portions adjacent the cross-over gap,
   (g) the reduced diameter portions being dimensioned in accordance with the following formulae:

$$T = \frac{T_e \times 6.6 D_m N}{E b h^3} \times 360°$$

wherein
   $T_e$ is inch-pound torque causing the spring to unwind;
   E is the elastic modulus of the spring stock;
   $b$ is the width of spring stock;
   $h$ is the height of spring stock;
   T is the degrees of spring unwind;
   $D_m$ is the mean diameter of the spring when mounted on the output and input elements (element diameter plus height of spring stock);
   N is the number of active coils being expanded (total number of coils less coil subject to large interference fit, if any) and $$a = \frac{\theta D_x}{N_c \times 360}$$

wherein
   $\theta$ is the angular contractive deflection of the spring (T approximately doubled);
   $N_c$ is the number of coils adjacent the reduced diameter portions subject to contraction;
   $D_x$ is the mean spring coil diameter at reduced diameter portions;
   $a$ is the deflection or reduction of spring diameter at reduced diameter portions.

2. The apparatus of claim 1 wherein said output member is fixed and the input is supported for rotation.

3. A backstopping spring clutch comprising a fixed drum element, a rotary drum element supported for rotation and spaced from said fixed drum element to define a cross-over gap therebetween, a helically coiled spring coaxially supported on the fixed and rotary drum elements and spanning said cross-over gap, said spring being constructed and arranged to grip the fixed drum element in one operative condition and disengage from the fixed drum element upon rotation of the rotary drum element in a predetermined direction, said rotary and fixed drum elements having reduced diameter portions extending from the cross-over gap so as to provide each of the elements with an annular stepped spring bearing surface, the reduced diameter portions being dimensioned in accordance with the following formulae:

$$T = \frac{T_e \times 6.6 D_m N}{E b h^3} \times 306°$$

wherein
   $T_e$ is the overrunning torque force acting on the spring to unwind the same as measured in inch-pounds;
   E is the elastic modulus of the spring material;
   $b$ is the width of spring stock;
   $h$ is the height of spring stock;
   T is degrees of spring unwind;
   $D_m$ is the mean diameter of the spring when mounted on the drum elements (hub diameter plus spring stock height $h$)
   N is the number of active spring coils being expanded (total number of spring coils less the number under heavy interference fit, if any).

$$a = \frac{\theta D_x}{N_c \times 360}$$

wherein
   $\theta$ is the angular deflection of the spring (T approximately doubled to allow for additional deflection due to foreign matter or corrosion);
   $N_c$ is the number of coils adjacent the reduced diameter spring engaging surfaces of the rotary and fixed drum elements;
   $D_x$ is the mean spring coil diameter at the reduced diameter spring engaging surfaces;

$a$ is the deflection or reduction of the internal spring diameter at the reduced diameter spring engaging surfaces of the drum elements.

References Cited

UNITED STATES PATENTS

| Re. 25,229 | 8/1962 | Sacchini et al. | |
|---|---|---|---|
| 1,952,415 | 3/1934 | Brownlee. | |
| 3,128,863 | 4/1964 | Tomko | 192—81 |
| 3,442,359 | 5/1969 | Atchison. | |
| 3,450,239 | 6/1969 | Ryan et al. | |

ALLAN D. HERRMANN, Primary Examiner

U.S. Cl. X.R.

188—77, 82.6; 192—81